United States Patent
Ljung

(10) Patent No.: US 8,923,868 B2
(45) Date of Patent: Dec. 30, 2014

(54) HYBRID ACCESS MODE DYNAMIC TRAFFIC OFFLOADING IN AN H(E)NB CELL ASSOCIATED WITH A CLOSED SUBSCRIBER GROUP

(71) Applicant: Sony Mobile Communications AB, Lund (SE)

(72) Inventor: Rickard Ljung, Helsingborg (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 21 days.

(21) Appl. No.: 13/690,326

(22) Filed: Nov. 30, 2012

(65) Prior Publication Data

US 2014/0155070 A1  Jun. 5, 2014

(51) Int. Cl.
| | | |
|---|---|---|
| H04W 4/00 | (2009.01) | |
| H04W 36/00 | (2009.01) | |
| H04W 28/08 | (2009.01) | |
| H04W 36/22 | (2009.01) | |
| H04W 48/08 | (2009.01) | |

(52) U.S. Cl.
CPC .............. *H04W 36/22* (2013.01); *H04W 28/08* (2013.01); *H04W 48/08* (2013.01)
USPC ............................ 455/438; 455/434; 455/436

(58) Field of Classification Search
CPC ...... H04W 48/16; H04W 48/02; H04W 48/04
USPC ................................................... 455/438, 434
See application file for complete search history.

(56) References Cited

U.S. PATENT DOCUMENTS

| | | | |
|---|---|---|---|
| 2009/0305699 A1* | 12/2009 | Deshpande et al. .......... | 455/434 |
| 2010/0240373 A1 | 9/2010 | Ji et al. | |
| 2011/0039594 A1* | 2/2011 | Liu et al. ........................ | 455/515 |
| 2012/0058792 A1 | 3/2012 | Liang et al. | |
| 2012/0094663 A1* | 4/2012 | Awoniyi et al. ............... | 455/434 |
| 2012/0115481 A1* | 5/2012 | Kim et al. ...................... | 455/436 |
| 2013/0137423 A1* | 5/2013 | Das et al. .................... | 455/426.1 |

FOREIGN PATENT DOCUMENTS

WO   2010/126155 A1   11/2010

OTHER PUBLICATIONS

International Search Report and Written Opinion dated Mar. 14, 2014 for PCT/IB2013/002455 filed Nov. 5, 2013.

* cited by examiner

*Primary Examiner* — Jinsong Hu
*Assistant Examiner* — William Nealon
(74) *Attorney, Agent, or Firm* — Renner, Otto, Boisselle & Sklar, LLP

(57) ABSTRACT

A method of hybrid access mode dynamic traffic offloading in a H(e)NB cell associated with a Closed Subscriber Group (CSG) includes determining that traffic load in the H(e)NB cell operating in hybrid access mode exceeds a threshold, and, based on this determination, transmitting a signal indicating to at least one non-CSG terminal that a second cell associated with the H(e)NB cell, other than a (e)NB cell, is available for connection to the at least one non-CSG terminal.

16 Claims, 6 Drawing Sheets

HYBRID ACCESS MODE DYNAMIC TRAFFIC OFFLOADING IN AN H(E)NB CELL ASSOCIATED WITH A CLOSED SUBSCRIBER GROUP

TECHNICAL FIELD OF THE INVENTION

The technology of the present disclosure relates generally to portable electronic devices and transmission equipment operable in a wireless communication network and more particularly to systems and methods for hybrid access mode dynamic traffic offloading in an H(e)NB cell associated with a Closed Subscriber Group.

DESCRIPTION OF THE RELATED ART

Portable electronic devices that operate in a cellular or wireless telecommunication network, such as mobile telephones and smartphones, tablet computers, cellular-connected laptop computers, and similar devices are ever increasing in popularity. In a typical wireless telecommunication network, these devices, also known as terminals, mobile stations, and/or user equipment (UE), communicate via a radio access network (RAN) to one or more core networks. The RAN covers a geographical area which is divided into cell areas with each cell area being served by a base station (e.g., a radio base station (RBS)) which in some networks may also be called, for example, NodeB in UMTS or eNodeB in LTE. A cell is a geographical area where radio coverage is provided by the radio base station equipment at a base station site. Each cell is identified by an identity within the local radio area, which is broadcasted in the cell. The base station communicates over the air interface with the terminals within range of the base station.

FIG. 1 illustrates an exemplary network 10 that includes a macro cell 11. In the macro cell 11, terminals 12-15 may communicate via base station 16 to a core network 19. In the example of FIG. 1, the base station 16 is denoted (e)NB, which in 3GPP terminology stands for a base station that can be a NodeB in UMTS or an eNodeB in LTE. The base station 16 may provide radio coverage to the terminals 12-15, which are within range of the base station 16, i.e., in the macro cell 11. The base station 16 communicates over the air interface with the terminals 12-15.

The network 10 also includes a small cell 21, which is a type of cell that has come to be known as small cell, microcell, femtocell, or picocell, among other terms. Small cells correspond to relatively low-powered base stations which have a significantly smaller geographical range compared to a macro cell. For example, a typical small cell may have a range of a few meters, maybe even 10, 100, or 200 meters, but still significantly smaller than a macro cell, which may be as large as 35 kilometers or more. Small cells may help provide improvements to both coverage and capacity, especially indoors. Consumers may benefit from improved coverage and potentially better voice quality and terminal battery life.

Small cells typically connect to the service provider's macro network via a broadband connection such as DSL or cable. 3GPP TS 22.220 Release 9 defines Home Node B (HNB) as "a Customer-premises equipment that connects a 3GPP UE over UTRAN wireless air interface to a mobile operator's network using a broadband IP backhaul" and Home eNodeB (HeNB) as "a Customer-premises equipment that connects a 3GPP UE over EUTRAN wireless air interface to a mobile operator's network using a broadband IP backhaul." 3GPP TS 22.220 Release 9 further specifies that HNB and HeNB (collectively referred to as H(e)NB throughout this disclosure) access the core network through an H(e)NB gateway (not shown).

In FIG. 1, the small cell 21 corresponds to the H(e)NB 26, which like the base station 16, connects to the core network 19. In the small cell 21, terminals 14-15 may communicate via the H(e)NB 26 to the core network 19. The H(e)NB 26 may provide radio coverage to the terminals 14-15, which are within range of the H(e)NB 26, i.e., in the small cell 21. The H(e)NB 26 communicates over the air interface with the terminals 14-15.

3GPP TS 22.220 Release 9 further specifies that the H(e)NB must be configurable in closed, open, and hybrid access modes. In closed access mode, only terminals that belong to a Closed Subscriber Group (CSG) associated with the H(e)NB may connect to the H(e)NB to obtain access to the network. In open access mode, any terminal, regardless of membership in the CSG, may connect to the H(e)NB to obtain access to the network. In hybrid access mode, the H(e)NB provides services to its associated CSG terminals and to non-CSG terminals with some preference given to the associated CSG terminals.

In a very loaded network an H(e)NB cell operating in hybrid access mode may encounter capacity and Quality of Service (QoS) issues relating to relatively large numbers of CSG terminals or non-CSG terminals connected to the H(e)NB.

SUMMARY

The concept of the systems and methods disclosed herein includes the capability for an H(e)NB cell associated with a CSG and operating in hybrid access mode to dynamically offload traffic to an alternative cell. This disclosure includes a proposal for an extension to the 3GPP standard and introduces the possibility for the H(e)NB cell operating in hybrid access mode to maintain its hybrid access status while at the same time giving terminals the option to connect to the alternative cell.

A benefit of this proposal is the leveraging of existing 3GPP standard protocols for further evolution of data traffic offload and QoS management by means of dynamic offloading, for example Wi-Fi offloading. With adoption of this proposed extension to the 3GPP standard, base stations would be capable of, in a standardized manner, handling even larger amounts of traffic with minimum negative impact to CSG terminals.

In one aspect of the invention, a method of hybrid access mode dynamic traffic offloading in a H(e)NB cell associated with a Closed Subscriber Group (CSG) includes determining that traffic load in the H(e)NB cell operating in hybrid access mode exceeds a threshold, and, based on the determining, transmitting a signal indicating to at least one non-CSG terminal that a second cell associated with the H(e)NB cell, other than a (e)NB cell, is available for connection to the at least one non-CSG terminal.

In one embodiment, the method includes, in response to the transmitting the signal indicating to the at least one non-CSG terminal that the second cell associated with the H(e)NB cell is available for connection to the at least one non-CSG terminal, receiving a signal indicating that the at least one non-CSG terminal requests connection to the second cell associated with the H(e)NB cell.

In another embodiment, the transmitting the signal indicating to the at least one non-CSG terminal that the second cell associated with the H(e)NB cell, other than a (e)NB cell, is available for connection includes transmitting a system information block (SIB) that includes at least one of identification information of the second cell associated with the H(e)NB cell and authorization information for the at least one non-CSG terminal to achieve access to the second cell associated with the H(e)NB cell.

In yet another embodiment, the second cell associated with the H(e)NB cell is one of a second H(e)NB cell operating in open mode, a second H(e)NB cell operating in a different radio access technology (RAT) from the RAT in which the H(e)NB cell operates, a cell operating in an unlicensed frequency band, and an IEEE 802.11 cell.

In one embodiment, the method includes determining that CSG terminals are connected to the H(e)NB cell operating in hybrid access mode, wherein the determining that the traffic load in the H(e)NB cell operating in hybrid access mode exceeds the threshold includes determining that handling by the H(e)NB cell operating in hybrid access mode of traffic load associated with the at least one non-CSG terminal would negatively affect QoS to the CSG terminals.

In another aspect of the invention, a method of hybrid access mode dynamic traffic offloading in a H(e)NB cell associated with a Closed Subscriber Group (CSG) includes transmitting a signal indicating that a non-CSG terminal requests connection to the H(e)NB cell, and, in response to the signal indicating that the non-CSG terminal requests connection to the H(e)NB cell, receiving a signal indicating to the non-CSG terminal that a second cell associated with the H(e)NB cell, other than a (e)NB cell, is available for connection to the non-CSG terminal.

In one embodiment, the method includes, in response to the signal indicating to the non-CSG terminal that the second cell associated with the H(e)NB cell is available for connection to the non-CSG terminal, transmitting a signal indicating that the non-CSG terminal requests connection to the second cell associated with the H(e)NB cell.

In another embodiment, the receiving the signal indicating to the non-CSG terminal that the second cell associated with the H(e)NB cell, other than a (e)NB cell, is available for connection includes receiving a system information block (SIB) that includes at least one of identification information of the second cell associated with the H(e)NB cell and authorization information for the non-CSG terminal to achieve access to the second cell associated with the H(e)NB cell.

In yet another embodiment, the method includes, in response to the signal indicating to the non-CSG terminal that the second cell associated with the H(e)NB cell is available for connection to the non-CSG terminal, establishing connection with the H(e)NB cell for voice communication and with the second cell associated with the H(e)NB cell for data communication.

In yet another aspect of the invention, a network entity in a H(e)NB cell associated with a Closed Subscriber Group (CSG) and operating in hybrid access mode includes a dynamic traffic offloading logic configured to determine that traffic load in the H(e)NB cell operating in hybrid access mode exceeds a threshold and further configured to, based on the determination, encode a signal indicating to at least one non-CSG terminal that a second cell associated with the H(e)NB cell, other than a (e)NB cell, is available for connection to the at least one non-CSG terminal, and a transmitter configured to transmit the signal indicating to the at least one non-CSG terminal that the second cell associated with the H(e)NB cell is available for connection to the at least one non-CSG terminal.

In one embodiment, the network entity includes a receiver configured to, in response to the transmitting the signal indicating to the at least one non-CSG terminal that the second cell associated with the H(e)NB cell is available for connection to the at least one non-CSG terminal, receive a signal indicating that the at least one non-CSG terminal requests connection to the second cell associated with the H(e)NB cell.

In another embodiment, the signal indicating to the at least one non-CSG terminal that the second cell associated with the H(e)NB cell is available for connection to the at least one non-CSG terminal includes a system information block (SIB) that includes at least one of identification information of the second cell associated with the H(e)NB cell and authorization information for the at least one non-CSG terminal to achieve access to the second cell associated with the H(e)NB cell.

In yet another embodiment, the second cell associated with the H(e)NB cell is one of a second H(e)NB cell operating in open mode, a second H(e)NB cell operating in a different radio access technology (RAT) from the RAT in which the H(e)NB cell operates, a cell operating in an unlicensed frequency band, and an IEEE 802.11 cell.

In one embodiment, the dynamic traffic offloading logic is configured to determine that handling by the H(e)NB cell operating in hybrid access mode of traffic load associated with the at least one non-CSG terminal would negatively affect QoS to CSG terminals connected to the H(e)NB cell operating in hybrid access mode.

In another aspect of the invention, a wireless terminal in a H(e)NB cell associated with a Closed Subscriber Group (CSG) and operating in hybrid access mode, wherein the wireless terminal is a wireless non-CSG terminal, includes a transmitter configured to transmit a signal indicating that the wireless non-CSG terminal requests connection to the H(e)NB cell, a receiver configured to receive in response to the signal indicating that the wireless non-CSG terminal requests connection to the H(e)NB cell a signal indicating to the wireless non-CSG terminal that a second cell associated with the H(e)NB cell, other than a (e)NB cell, is available for connection to the wireless non-CSG terminal, and a hybrid access mode logic configured to determine, based on the signal indicating to the wireless non-CSG terminal that the second cell associated with the H(e)NB cell is available for connection to the wireless non-CSG terminal, whether the wireless non-CSG terminal is to request connection to the second cell associated with the H(e)NB cell.

In one embodiment, the hybrid access mode logic is configured to encode a signal indicating that the wireless non-CSG terminal requests connection to the second cell associated with the H(e)NB cell, and the transmitter is configured to transmit the signal indicating that the wireless non-CSG terminal requests connection to the second cell associated with the H(e)NB cell.

In another embodiment, the signal indicating to the wireless non-CSG terminal that the second cell associated with the H(e)NB cell is available for connection to the wireless non-CSG terminal includes a system information block (SIB) that includes at least one of identification information of the second cell associated with the H(e)NB cell and authorization information for the wireless non-CSG terminal to achieve connection to the second cell associated with the H(e)NB cell.

In yet another embodiment, the hybrid access mode logic is configured to determine, based on the signal indicating to the wireless non-CSG terminal that the second cell associated with the H(e)NB cell is available for connection to the wireless non-CSG terminal, that the wireless non-CSG terminal is to request connection with the H(e)NB cell for voice communication and with the second cell associated with the H(e)NB cell for data communication.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1:
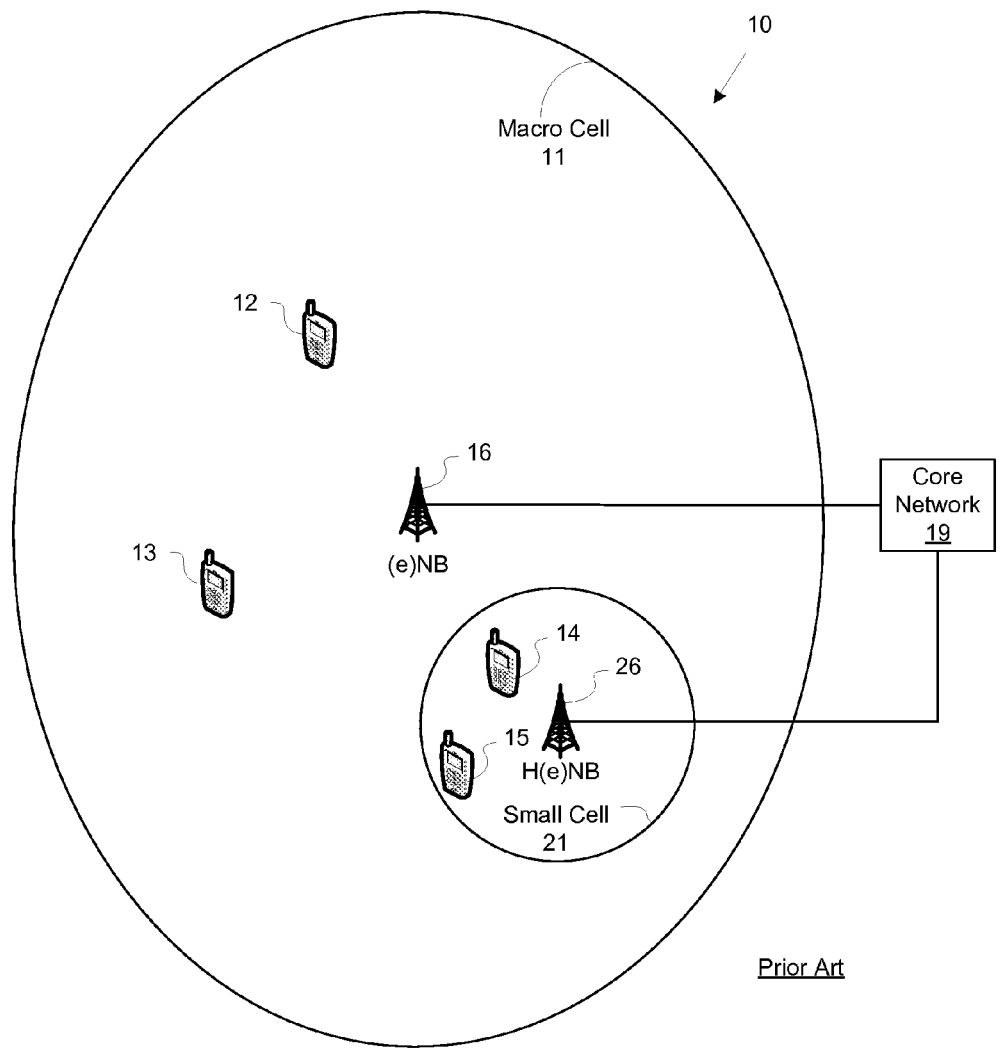
FIG. 1 illustrates a prior art network that includes a macro cell and a small cell.

Embodiments of the present invention will now be described with reference to the drawings, wherein like reference numerals are used to refer to like elements throughout. It will be understood that the figures are not necessarily to scale.

Figure 2:
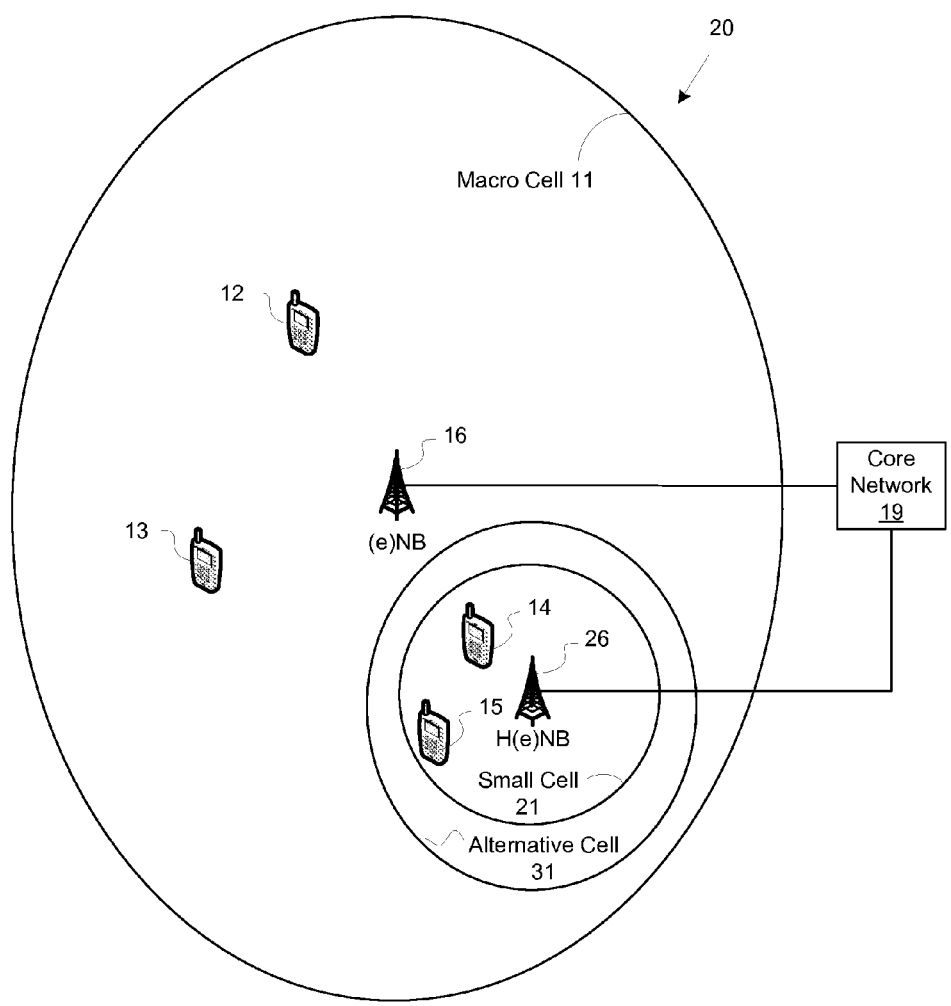
FIG. 2 illustrates an exemplary network that includes a macro cell, a small cell, and an alternative cell.

FIG. 2 illustrates an exemplary network 20. Similar to the network 10 described above, the network 20 includes a macro cell 11 that corresponds to the (e)NB mobile station 16. In the macro cell 11, terminals 12-15 may communicate with the core network 19 via the base station 16. The base station 16 may provide radio coverage to the terminals 12-15, which are within range of the base station 16, i.e., in the macro cell 11. The base station 16 communicates over the air interface with the terminals 12-15.

The network 20 also includes a small cell 21, which corresponds to the H(e)NB 26, which also connects to the core network 19. In the small cell 21, terminals 14-15 may communicate via the H(e)NB 26 to the core network 19. The H(e)NB 26 may provide radio coverage to the terminals 14-15, which are within range of the H(e)NB 26, i.e., in the small cell 21. The H(e)NB 26 communicates over the air interface with the terminals 14-15.

The network 20 further includes an alternative cell 31 associated with the H(e)NB cell 21. The alternative cell 31 may in theory be any type of cell (e.g., a second H(e)NB cell operating in open mode, a second H(e)NB cell operating in a different radio access technology (RAT) from the RAT in which the H(e)NB cell 21 operates, a cell operating in an unlicensed frequency band, an IEEE 802.11 cell, and so on).

In a scenario where the H(e)NB cell 21 operating in hybrid access mode is operating at a high traffic level, the H(e)NB cell 21 may dynamically offload non-CSG terminals to the alternative cell 31. This way, offloaded non-CSG terminals may still be able to get satisfactory traffic access via the alternative cell 31 even when the H(e)NB cell 21 operating in hybrid access mode is highly loaded.

For example, let's assume that the H(e)NB 26 is operating in hybrid access mode and that terminals 14 and 15 are approaching or have just entered the cell 21. Terminal 15 is a CSG terminal and terminal 14 is a non-CSG terminal. Both terminals request connection to H(e)NB 26 operating in hybrid access mode. H(e)NB 26 will grant connection to terminal 15, the CSG terminal. Moreover, according to 3GPP specifications, H(e)NB 26 will also need to accept terminal 14 even though terminal 14 does not belong to the CSG. However, if H(e)NB 26 operating in hybrid mode is highly loaded, H(e)NB 26 may transmit, for example, a system information block (SIB) within its broadcasted control signals indicating that non-CSG terminals should use the alternative cell 31.

The 3GPP specifications describing system information blocks are TS 25.331 for WCDMA and TS 36.331 for LTE. A modification to these specifications may include, for example, modifications to section 10 in TS 25.331 and/or section 6 in TS 36.331 to specify SIB including cell information regarding alternative cells available for re-routing or offloading. A SIB may be specified that includes cell ID and authorization information in order for terminals to achieve access to the alternative cell.

Figure 3:
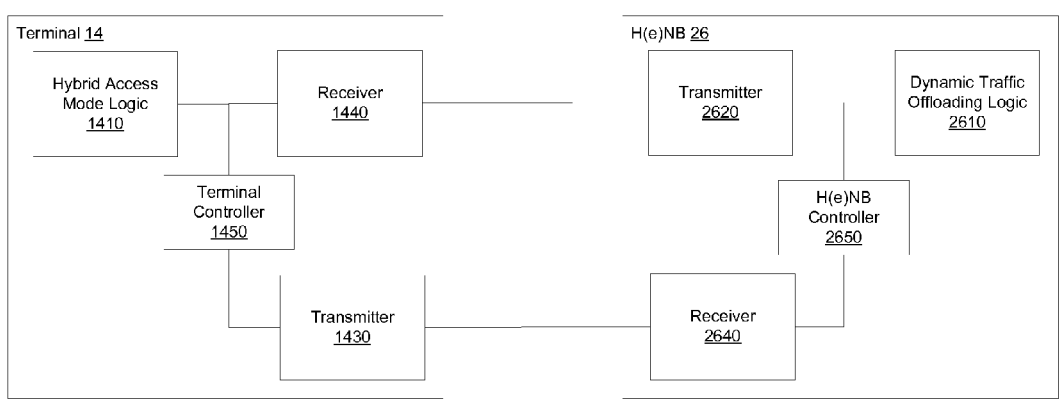
FIG. 3 illustrates a schematic diagram of a portion of the small cell of FIG. 2 including exemplary block diagrams of a terminal and an H(e)NB.

FIG. 3 illustrates a schematic diagram of a portion of the small cell 21 including exemplary block diagrams of the terminal 14 and the H(e)NB 26. In the illustrated embodiment, the H(e)NB 26 and thus the small cell 21 are associated with a Closed Subscriber Group (CSG) and operating in hybrid access mode. The wireless terminal 14 is a wireless non-CSG terminal.

The terminal 14 includes a transmitter 1430 that transmits a signal indicating that the terminal 14 requests connection to the H(e)NB 26 and thus to the cell 21. The terminal 14 further includes a receiver 1440 that, in response to the signal indicating that the terminal 14 requests connection to the H(e)NB 26, receives a signal indicating to the terminal 14 that an alternative cell (not shown) associated with the H(e)NB 26 is available for connection to the terminal 14. In one embodiment, the receiver 1440 receives the signal indicating to the terminal 14 that an alternative cell associated with the H(e)NB 26 is available for connection to the terminal 14 unprompted via a broadcasted signal from the H(e)NB 26.

As discussed above, the alternative cell 31 may be any type of cell (e.g., a second H(e)NB cell operating in open mode, a second H(e)NB cell operating in a different radio access technology (RAT) from the RAT in which the H(e)NB cell 21 operates, a cell operating in an unlicensed frequency band, an IEEE 802.11 cell, and so on), other than a (e)NB cell.

The terminal 14 further includes a hybrid access mode logic 1410 that determines based on the received signal indicating to the terminal 14 that the alternative cell associated with the H(e)NB 26 is available for connection to the terminal 14 whether the terminal 14 is to request connection to the alternative cell associated with the H(e)NB 26 or to persist in requesting connection to the H(e)NB 26.

Where the hybrid access mode logic 1410 determines that the terminal 14 is to request connection to the alternative cell associated with the H(e)NB 26, the transmitter 1430 transmits a signal indicating that the terminal 14 requests connection to the alternative cell associated with the H(e)NB 26.

In one embodiment, some types of communication of the non-CSG terminal 14 are offloaded to the alternative cell, while other types of communication of the terminal 14 are provided via the small cell 21. For example, data communication of the non-CSG terminal 14 may be offloaded to the alternative cell, while voice communication of the terminal 14 is provided by the small cell 21.

In one embodiment, the receiver 1440 receives a system information block (SIB) that includes identification information of the alternative cell associated with the H(e)NB 26 and/or authorization information for the non-CSG terminal 14 to achieve access to the alternative cell associated with the H(e)NB 26. The receiver 1440 may receive the system information block (SIB) that includes identification information of the alternative cell associated with the H(e)NB 26 and/or authorization information for the non-CSG terminal 14 in response to the initial signal indicating that the terminal 14 requests connection to the H(e)NB 26 or the receiver 1440 may receive the system information block (SIB) that includes identification information of the alternative cell associated with the H(e)NB 26 and/or authorization information for the non-CSG terminal 14 in a subsequent signal received by the H(e)NB 26.

The terminal 14 further includes a terminal controller 1450 operatively connected to the hybrid access mode logic 1410, the transmitter 1430, and the receiver 1440 to thereby control the terminal 14.

The H(e)NB 26 includes a dynamic traffic offloading logic 2610 that determines whether traffic load in the H(e)NB 26 operating in hybrid access mode exceeds a threshold. In one embodiment, the dynamic traffic offloading logic 2610 determines that traffic load in the H(e)NB 26 exceeds a threshold by measuring the traffic load and comparing the measure traffic load with the threshold. In one embodiment, the dynamic traffic offloading logic 2610 determines that traffic load in the H(e)NB 26 exceeds a threshold by receiving a signal from some other entity in the network communicating to the H(e)NB 26 that traffic load exceeds the threshold.

In one embodiment, the dynamic traffic offloading logic 2610 determines that handling by the H(e)NB 26 operating in hybrid access mode of traffic load associated with at least one non-CSG terminal would negatively affect Quality of Service (QoS) or some other metric to CSG terminals connected to the H(e)NB 26.

The H(e)NB 26 further includes a receiver 2610 that receives signals from CSG and non-CSG terminals requesting connection to the H(e)NB.

The H(e)NB 26 further includes a transmitter 2620 that transmits a signal indicating to a non-CSG terminal 14 that an alternative cell associated with the H(e)NB 26 is available for connection to the terminal 14. In one embodiment, the transmitter 2620 transmits a system information block (SIB) that includes identification information of the alternative cell associated with the H(e)NB 26 and authorization information for the non-CSG terminal 14 to achieve access to the alternative cell.

In some embodiments, the transmitter 2620 transmits the signal indicating to the non-CSG terminal 14 that a second alternative cell associated with the H(e)NB 26 is available for connection to the terminal 14 individually to each terminal 14. For embodiments where the transmitter 2620 transmits the signal on an individual terminal basis, the RAT standard (e.g., 3GPP standard for WCDMA or LTE) may include a signal indicating to the non-CSG terminal 14 that an alternative cell associated with the H(e)NB 26 is available for connection to the terminal 14 within, for example, the Radio Resource Control (RRC) configuration.

The H(e)NB 26 further includes a H(e)NB controller 2650 operatively connected to the dynamic traffic offloading logic 2610, the transmitter 2620, and the receiver 2640 to thereby control the H(e)NB 26.

Figure 4:
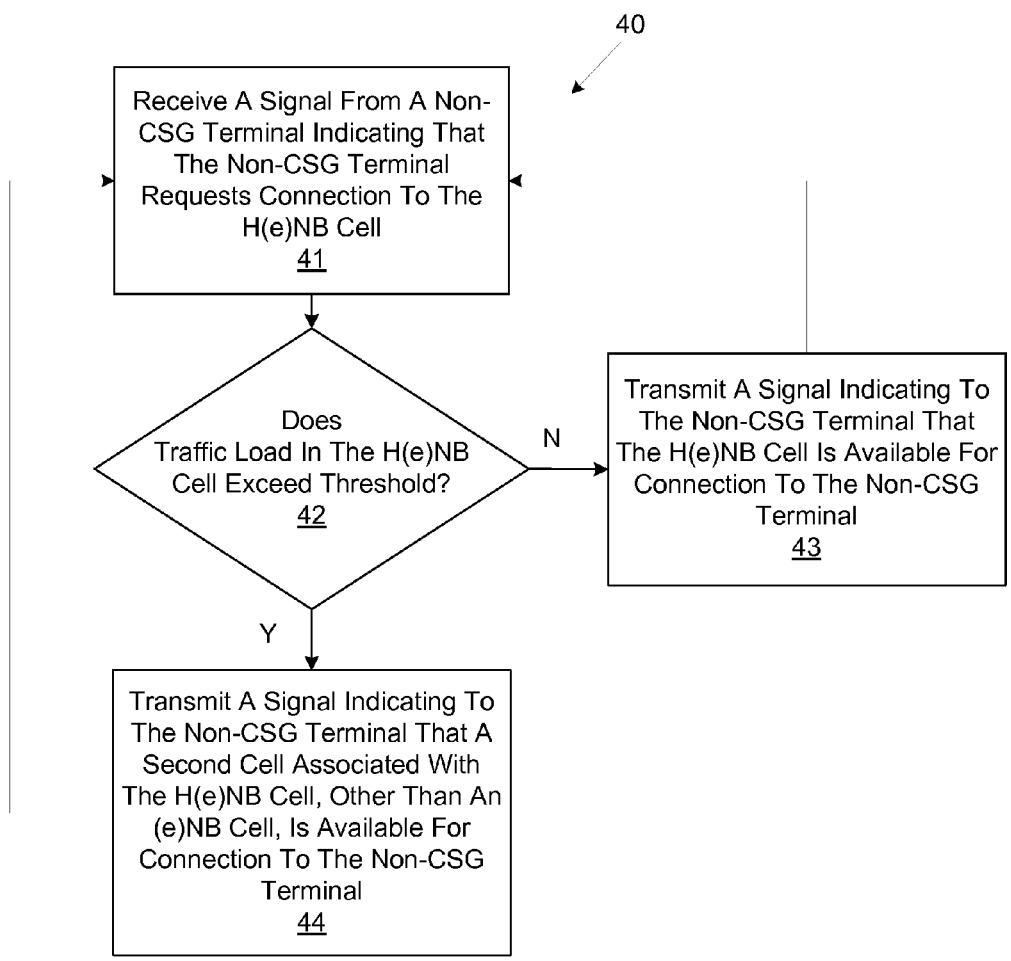
FIG. 4 illustrates logical flow of an exemplary method for hybrid access mode dynamic traffic offloading in an H(e)NB cell associated with a Closed Subscriber Group (CSG).
Figure 5:
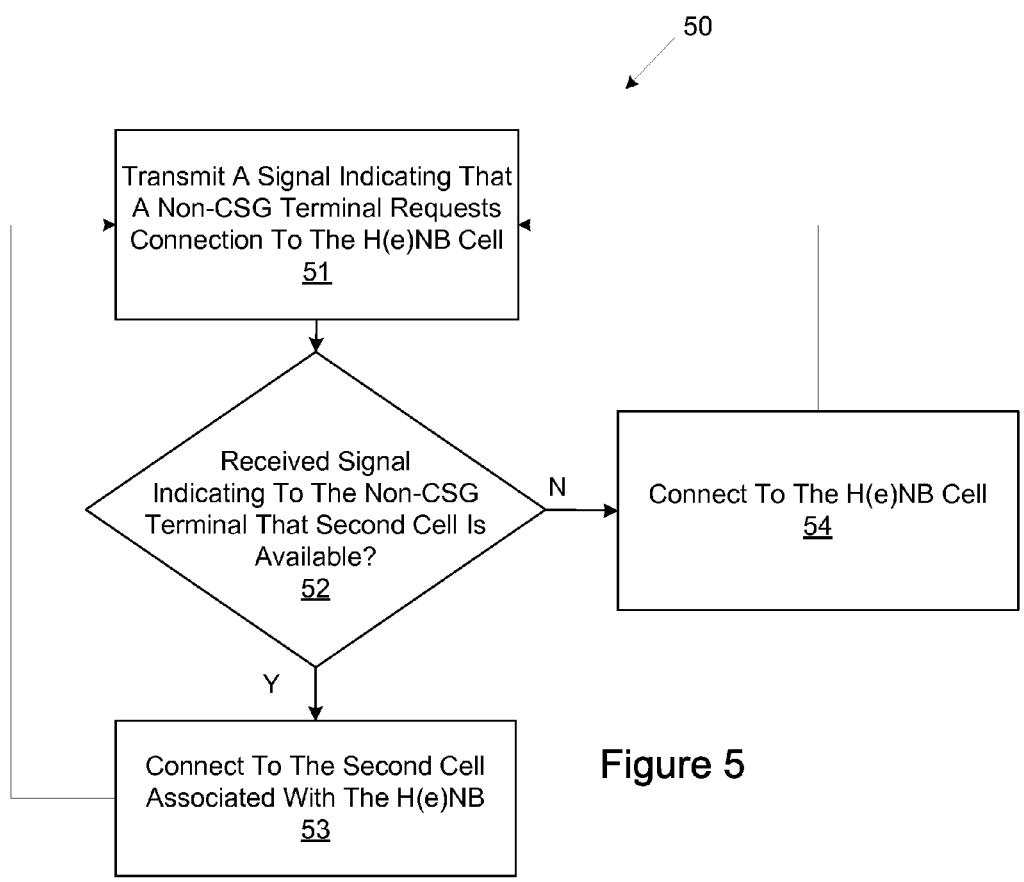
FIG. 5 illustrates logical flow of an exemplary method for hybrid access mode dynamic traffic offloading in an H(e)NB cell associated with a Closed Subscriber Group (CSG).

In accordance with the above features, FIGS. 4 and 5 show flowcharts that illustrate logical operations to implement exemplary methods for hybrid access mode dynamic traffic offloading in an H(e)NB cell associated with a Closed Subscriber Group (CSG). The exemplary methods may be carried out by executing embodiments of the base stations, terminals, mobile telephones, flash devices or machine-readable storage media disclosed herein, for example. Thus, the flowcharts of FIGS. 4 and 5 may be thought of as depicting steps of a method carried out in the above-disclosed systems or devices by operation of hardware, software, or combinations thereof. Although FIGS. 4 and 5 show a specific order of executing functional logic blocks, the order of executing the blocks may be changed relative to the order shown. Also, two or more blocks shown in succession may be executed concurrently or with partial concurrence. Certain blocks also may be omitted.

In reference to FIG. 4, logical flow of a method 40 for hybrid access mode dynamic traffic offloading in a H(e)NB cell associated with a Closed Subscriber Group (CSG) includes, at 41, receiving a signal from a non-CSG terminal indicating that the non-CSG terminal requests connection to the H(e)NB cell. At 42, the method 40 determines whether traffic load in the H(e)NB cell operating in hybrid access mode exceeds a threshold. If there is not determination as to whether traffic load in the H(e)NB cell operating in hybrid access mode exceeds the threshold, at 43, the method 40 transmits a signal indicating to the non-CSG terminal that the H(e)NB cell is available for connection to the non-CSG terminal. Back to 42, if traffic load in the H(e)NB cell operating in hybrid access mode exceeds a threshold, at 44, the method 40 transmits a signal indicating to the non-CSG terminal that a second cell associated with the H(e)NB cell, other than an (e)NB cell, is available for connection to the non-CSG terminal.

In one embodiment, the method transmits the signal indicating to the non-CSG terminal that a second cell associated with the H(e)NB cell, other than an (e)NB cell, is available for connection to the non-CSG terminal upon determining that traffic load in the H(e)NB cell operating in hybrid access mode exceeds the threshold unprompted by any signal from the non-CSG terminal. In one embodiment, the method broadcast the signal indicating to the non-CSG terminal that a second cell associated with the H(e)NB cell, other than an (e)NB cell, is available for connection to the non-CSG terminal to all terminals within range of the H(e)NB cell upon determining that traffic load in the H(e)NB cell operating in hybrid access mode exceeds the threshold unprompted by any signal from the non-CSG terminal.

In one embodiment, the transmitting the signal indicating to the non-CSG terminal that a second cell associated with the H(e)NB cell, other than an (e)NB cell, is available for connection to the non-CSG terminal includes transmitting a system information block (SIB) that includes identification information of the second cell associated with the H(e)NB cell and authorization information for the at least one non-CSG terminal to achieve access to the second cell associated with the H(e)NB cell.

In one embodiment, the method 40 includes receiving a signal from the non-CSG terminal indicating that the non-CSG terminal requests connection to the second cell associated with the H(e)NB cell. In one embodiment, the method 40 includes transmitting a signal indicating that the non-CSG terminal is to be connected to the second cell associated with the H(e)NB cell.

In one embodiment, where the method 40 has determined that CSG terminals are connected to the H(e)NB cell operating in hybrid access mode, the determining that the traffic load in the H(e)NB cell operating in hybrid access mode exceeds the threshold includes determining that handling by the H(e)NB cell operating in hybrid access mode of traffic load associated with the at least one non-CSG terminal would negatively affect QoS or some other metric associated with communication services to the CSG terminals.

In reference to FIG. 5, logical flow of a method 50 of hybrid access mode dynamic traffic offloading in an H(e)NB cell associated with a Closed Subscriber Group (CSG) is shown. At 51, the method 50 includes transmitting a signal indicating that a non-CSG terminal requests connection to the H(e)NB cell. At 52, the method 50 may receive a signal indicating to the non-CSG terminal that a second cell associated with the H(e)NB cell, other than an (e)NB cell, is available for connection to the non-CSG terminal.

In one embodiment, the receiving the signal indicating to the non-CSG terminal that the second cell associated with the H(e)NB cell, other than a (e)NB cell, is available for connection includes receiving a system information block (SIB) that includes identification information of the second cell associated with the H(e)NB cell and authorization information for the non-CSG terminal to achieve access to the second cell associated with the H(e)NB cell.

If the signal indicating to the non-CSG terminal that a second cell associated with the H(e)NB cell, other than an (e)NB cell, is available for connection to the non-CSG terminal is received, the method 50 further includes, at 53, connecting to the second cell associated with the H(e)NB. In one embodiment, connecting to the second cell associated with the H(e)NB cell includes transmitting a signal indicating that the non-CSG terminal requests connection to the second cell associated with the H(e)NB cell. However, if the signal indicating to the non-CSG terminal that a second cell associated with the H(e)NB cell, other than an (e)NB cell, is available for connection to the non-CSG terminal is not received, the method 50 includes, at 54, connecting to the H(e)NB cell.

In one embodiment, some types of communication of the non-CSG terminal are offloaded to the alternative cell, while other types of communication of the terminal are provided via the small cell. For example, data communication of the non-CSG terminal may be offloaded to the alternative cell, while voice communication of the terminal is provided by the small cell.

Figure 6:
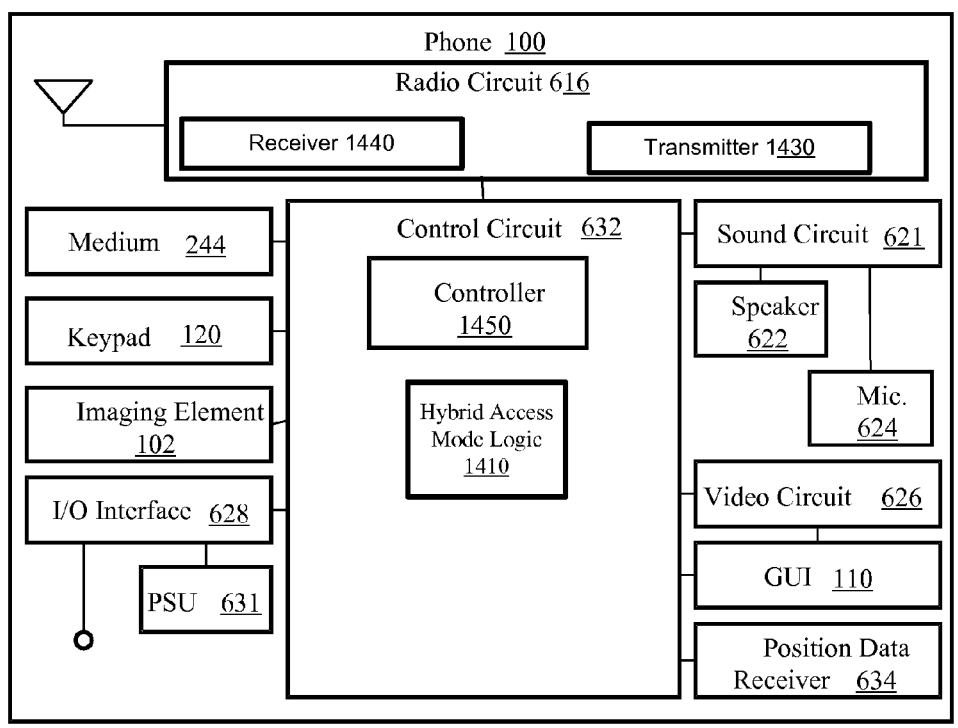
FIG. 6 illustrates a detailed block diagram of an exemplary wireless telecommunication terminal.

FIG. 6 illustrates a detailed block diagram of an exemplary terminal, which in the illustrated embodiment is represented by the mobile phone 100. The phone 100 includes a control circuit 632 that is responsible for overall operation of the phone 100. For this purpose, the control circuit 632 includes the terminal controller 1450 that executes various applications, including applications related to or that form part of the phone 100 functioning as a terminal.

In one embodiment, functionality of the phone 100 acting as the terminal described above in reference to FIGS. 1-5 are embodied in the form of executable logic (e.g., lines of code, software, or a program) that is stored in the non-transitory computer readable medium 244 (e.g., a memory, a hard drive, etc.) of the phone 100 and is executed by the control circuit 632. The described operations may be thought of as a method that is carried out by the phone 100. Variations to the illustrated and described techniques are possible and, therefore, the disclosed embodiments should not be considered the only manner of carrying out phone 100 functions.

The phone 100 further includes the GUI 110, which may be coupled to the control circuit 632 by a video circuit 626 that converts video data to a video signal used to drive the GUI 110. The video circuit 626 may include any appropriate buffers, decoders, video data processors and so forth.

The phone 100 further includes communications circuitry that enables the phone 100 to establish communication connections such as a telephone call. In the exemplary embodiment, the communications circuitry includes a radio circuit 616. The radio circuit 616 includes one or more radio frequency transceivers including the receiver 1440, the transmitter 1430 and an antenna assembly (or assemblies). Since the phone 100 is capable of communicating using more than one standard, the radio circuit 616 including the receiver 1440 and the transmitter 1430 represents each radio transceiver and antenna needed for the various supported connection types. The radio circuit 616 including the receiver 1440 and the transmitter 1430 further represents any radio transceivers and antennas used for local wireless communications directly with an electronic device, such as over a Bluetooth interface.

As indicated, the phone 100 includes the primary control circuit 632 that is configured to carry out overall control of the functions and operations of the phone 100. The terminal controller 1450 of the control circuit 632 may be a central processing unit (CPU), microcontroller or microprocessor. The terminal controller 1450 executes code stored in a memory (not shown) within the control circuit 632 and/or in a separate memory, such as the machine-readable storage medium 244, in order to carry out operation of the phone 100. The machine-readable storage medium 244 may be, for example, one or more of a buffer, a flash memory, a hard drive, a removable media, a volatile memory, a non-volatile memory, a random access memory (RAM), or other suitable device. In a typical arrangement, the machine-readable storage medium 244 includes a non-volatile memory for long term data storage and a volatile memory that functions as system memory for the control circuit 632. The machine-readable storage medium 244 may exchange data with the control circuit 632 over a data bus. Accompanying control lines and an address bus between the machine-readable storage medium 244 and the control circuit 632 also may be present. The machine-readable storage medium 244 is considered a non-transitory computer readable medium. In one embodiment, data regarding the indication is stored in the machine-readable storage medium 244. Within the primary control circuit 632 is the hybrid access mode logic 1410.

The phone 100 may further include a sound circuit 621 for processing audio signals. Coupled to the sound circuit 621 are a speaker 622 and a microphone 624 that enable a user to listen and speak via the phone 100, and hear sounds generated in connection with other functions of the device 100. The sound circuit 621 may include any appropriate buffers, encoders, decoders, amplifiers and so forth.

The phone 100 may further include a keypad 120 that provides for a variety of user input operations as described above in reference to FIG. 1. The phone 100 may further include one or more input/output (I/O) interface(s) 628. The I/O interface(s) 628 may be in the form of typical electronic device I/O interfaces and may include one or more electrical connectors for operatively connecting the phone 100 to another device (e.g., a computer) or an accessory (e.g., a personal handsfree (PHF) device) via a cable. Further, operating power may be received over the I/O interface(s) 628 and power to charge a battery of a power supply unit (PSU) 631 within the phone 100 may be received over the I/O interface(s) 628. The PSU 631 may supply power to operate the phone 100 in the absence of an external power source.

The phone 100 also may include various other components. For instance, the imaging element 102 may be present for taking digital pictures and/or movies. Image and/or video files corresponding to the pictures and/or movies may be stored in the machine-readable storage medium 244. As another example, a position data receiver 634, such as a global positioning system (GPS) receiver, may be present to assist in determining the location of the phone 100.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method of hybrid access mode dynamic traffic offloading in an H(e)NB cell associated with a Closed Subscriber Group (CSG), the method comprising:
    determining that traffic load in the H(e)NB cell operating in hybrid access mode exceeds a threshold;
    based on the determining, transmitting a signal indicating to at least one non-CSG terminal that a second cell associated with the H(e)NB cell, other than a (e)NB cell, is available for connection to the at least one non-CSG terminal;
    in response to the transmitting the signal indicating to the at least one non-CSG terminal that the second cell associated with the H(e)NB cell is available for connection to the at least one non-CSG terminal, receiving a signal indicating that the at least one non-CSG terminal requests connection to the second cell associated with the H(e)NB cell; and
    in response to the determining and the receiving the signal indicating that the at least one non-CSG terminal requests connection to the second cell associated with the H(e)NB cell, providing to the at least one non-CSG terminal connection with the H(e)NB cell for voice communication and with the second cell associated with the H(e)NB cell for data communication.

2. The method of claim 1, wherein the transmitting the signal indicating to the at least one non-CSG terminal that the second cell associated with the H(e)NB cell, other than a (e)NB cell, is available for connection includes:
    transmitting a system information block (SIB) that includes at least one of identification information of the second cell associated with the H(e)NB cell and authorization information for the at least one non-CSG terminal to achieve access to the second cell associated with the H(e)NB cell.

3. The method of claim 1, wherein the second cell associated with the H(e)NB cell is one of:
    a second H(e)NB cell operating in open mode,
    a second H(e)NB cell operating in a different radio access technology (RAT) from the RAT in which the H(e)NB cell operates,
    a cell operating in an unlicensed frequency band, and
    an IEEE 802.11 cell.

4. The method of claim 1, comprising:
    determining that CSG terminals are connected to the H(e)NB cell operating in hybrid access mode,
    wherein the determining that the traffic load in the H(e)NB cell operating in hybrid access mode exceeds the threshold includes:
        determining that handling by the H(e)NB cell operating in hybrid access mode of traffic load associated with the at least one non-CSG terminal would negatively affect QoS to the CSG terminals.

5. A method of hybrid access mode dynamic traffic offloading in an H(e)NB cell associated with a Closed Subscriber Group (CSG), the method comprising:
    transmitting a signal indicating that a non-CSG terminal requests connection to the H(e)NB cell;
    in response to the signal indicating that the non-CSG terminal requests connection to the H(e)NB cell, receiving a signal indicating to the non-CSG terminal that a second cell associated with the H(e)NB cell, other than a (e)NB cell, is available for connection to the non-CSG terminal; and
    in response to the signal indicating to the non-CSG terminal that the second cell associated with the H(e)NB cell is available for connection to the non-CSG terminal, transmitting a signal indicating that the non-CSG terminal requests connection to the second cell associated with the H(e)NB cell.

6. The method of claim 5, wherein the receiving the signal indicating to the non-CSG terminal that the second cell associated with the H(e)NB cell, other than a (e)NB cell, is available for connection includes:
    receiving a system information block (SIB) that includes at least one of identification information of the second cell associated with the H(e)NB cell and authorization information for the non-CSG terminal to achieve access to the second cell associated with the H(e)NB cell.

7. The method of claim 5, wherein the second cell associated with the H(e)NB cell is one of:
    a second H(e)NB cell operating in open mode,
    a second H(e)NB cell operating in a different radio access technology (RAT) from the RAT in which the H(e)NB cell operates,
    a cell operating in an unlicensed frequency band, and
    an IEEE 802.11 cell.

8. The method of claim 5, comprising:
    in response to the signal indicating to the non-CSG terminal that the second cell associated with the H(e)NB cell is available for connection to the non-CSG terminal, establishing connection with the H(e)NB cell for voice communication and with the second cell associated with the H(e)NB cell for data communication.

9. A network entity in an H(e)NB cell associated with a Closed Subscriber Group (CSG) and operating in hybrid access mode, the network entity comprising:
    a dynamic traffic offloading logic configured to determine that traffic load in the H(e)NB cell operating in hybrid access mode exceeds a threshold and further configured to, based on the determination, encode a signal indicating to at least one non-CSG terminal that a second cell associated with the H(e)NB cell, other than a (e)NB cell, is available for connection to the at least one non-CSG terminal;
    a transmitter configured to transmit the signal indicating to the at least one non-CSG terminal that the second cell associated with the H(e)NB cell is available for connection to the at least one non-CSG terminal;
    a receiver configured to, in response to the transmitting the signal indicating to the at least one non-CSG terminal that the second cell associated with the H(e)NB cell is available for connection to the at least one non-CSG terminal, receive a signal indicating that the at least one non-CSG terminal requests connection to the second cell associated with the H(e)NB cell; and wherein the transmitter is further configured to, in response to the determining and the receiving the signal indicating that the at least one non-CSG terminal requests connection to the second cell associated with the H(e)NB cell, providing to the at least one non-CSG terminal connection with the H(e)NB cell for voice communication and with the second cell associated with the H(e)NB cell for data communication.

10. The network entity of claim 9, wherein the signal indicating to the at least one non-CSG terminal that the second cell associated with the H(e)NB cell is available for connection to the at least one non-CSG terminal includes a system information block (SIB) that includes at least one of identification information of the second cell associated with the H(e)NB cell and authorization information for the at least one non-CSG terminal to achieve access to the second cell associated with the H(e)NB cell.

11. The network entity of claim 9, wherein the second cell associated with the H(e)NB cell is one of:
 a second H(e)NB cell operating in open mode,
 a second H(e)NB cell operating in a different radio access technology (RAT) from the RAT in which the H(e)NB cell operates,
 a cell operating in an unlicensed frequency band, and
 an IEEE 802.11 cell.

12. The network entity of claim 9, wherein the dynamic traffic offloading logic is configured to determine that handling by the H(e)NB cell operating in hybrid access mode of traffic load associated with the at least one non-CSG terminal would negatively affect QoS to CSG terminals connected to the H(e)NB cell operating in hybrid access mode.

13. A wireless terminal in an H(e)NB cell associated with a Closed Subscriber Group (CSG) and operating in hybrid access mode, wherein the wireless terminal is a wireless non-CSG terminal, the wireless terminal comprising:
 a transmitter configured to transmit a signal indicating that the wireless non-CSG terminal requests connection to the H(e)NB cell;
 a receiver configured to receive in response to the signal indicating that the wireless non-CSG terminal requests connection to the H(e)NB cell a signal indicating to the wireless non-CSG terminal that a second cell associated with the H(e)NB cell, other than a (e)NB cell, is available for connection to the wireless non-CSG terminal;
 a hybrid access mode logic configured to determine, based on the signal indicating to the wireless non-CSG terminal that the second cell associated with the H(e)NB cell is available for connection to the wireless non-CSG terminal, whether the wireless non-CSG terminal is to request connection to the second cell associated with the H(e)NB cell; and
 the hybrid access mode logic is configured to encode a signal indicating that the wireless non-CSG terminal requests connection to the second cell associated with the H(e)NB cell, and
 the transmitter is configured to transmit the signal indicating that the wireless non-CSG terminal requests connection to the second cell associated with the H(e)NB cell.

14. The wireless terminal of claim 13, wherein the signal indicating to the wireless non-CSG terminal that the second cell associated with the H(e)NB cell is available for connection to the wireless non-CSG terminal includes a system information block (SIB) that includes at least one of identification information of the second cell associated with the H(e)NB cell and authorization information for the wireless non-CSG terminal to achieve connection to the second cell associated with the H(e)NB cell.

15. The wireless terminal of claim 13, wherein the second cell associated with the H(e)NB cell is one of:
 a second H(e)NB cell operating in open mode,
 a second H(e)NB cell operating in a different radio access technology (RAT) from the RAT in which the H(e)NB cell operates,
 a cell operating in an unlicensed frequency band, and
 an IEEE 802.11 cell.

16. The wireless terminal of claim 13, wherein the hybrid access mode logic is configured to determine, based on the signal indicating to the wireless non-CSG terminal that the second cell associated with the H(e)NB cell is available for connection to the wireless non-CSG terminal, that the wireless non-CSG terminal is to request connection with the H(e)NB cell for voice communication and with the second cell associated with the H(e)NB cell for data communication.

* * * * *